United States Patent

Schlaich et al.

Patent Number: 5,626,214
Date of Patent: May 6, 1997

[54] ARRANGEMENT FOR PREVENTING RATTLING IN A SYNCHRONIZED GEARBOX

[75] Inventors: Birger Schlaich, Stockholm; Thord Karlsson, Gnesta; Tord Andersson, Södertälje, all of Sweden

[73] Assignee: Saab Automobile Aktiebolag, Sweden

[21] Appl. No.: 571,256

[22] Filed: Dec. 12, 1995

[30] Foreign Application Priority Data

Dec. 21, 1994 [SE] Sweden .................... 9404489-8

[51] Int. Cl.⁶ .................................................. F16D 23/06
[52] U.S. Cl. ...................................... 192/53.34; 74/339
[58] Field of Search ............................ 192/30 V, 48.91, 192/53.3, 53.34, 53.341, 53.342, 53.343, 53.35, 53.36, 53.363, 53.331; 74/339

[56] References Cited

U.S. PATENT DOCUMENTS

| | | | |
|---|---|---|---|
| 3,228,499 | 1/1966 | Peras . | |
| 3,695,403 | 10/1972 | Eastwood | 192/53.331 |
| 3,700,083 | 10/1972 | Ashikawa et al. | 192/53.34 |
| 3,795,293 | 3/1974 | Worner | 192/53.35 |
| 4,315,564 | 2/1982 | Numazawa et al. | 192/53.34 |
| 4,519,265 | 5/1985 | Dolan et al. | 192/30 V X |
| 4,660,707 | 4/1987 | Sadanori et al. | 192/53.34 |
| 4,750,597 | 6/1988 | Ikemoto et al. | 192/53.34 |
| 5,531,305 | 7/1996 | Roberts et al. | 192/53.34 X |

*Primary Examiner*—Richard M. Lorence
*Attorney, Agent, or Firm*—Ostrolenk, Faber, Gerb & Soffen, LLP

[57] ABSTRACT

Arrangement for preventing rattling caused by a synchronizing ring [(36)] for an unengaged gear in a synchronized gearbox. When the gear is not engaged, its synchronizing ring is arranged for limited rotation relative to a hub arranged non-rotatably on a shaft [(6)] and relative to a synchronizing sleeve which is movable axially on that hub. Radially acting plate spring elements [(50)] are incorporated with prestress in the arcuate space [(45)] between an outer surface [(46)] of the synchronizing ring [(36)] and an inside surface [(48)] of the ridged rim [(34)] of the synchronizing hub. The plate spring elements [(50)] cooperate with the synchronizing ring [(36)] to hold the synchronizing ring in a position of suspension relative to the synchronizing hub [(10)] and thereby prevent it being rotated between its end positions and causing rattling.

23 Claims, 4 Drawing Sheets

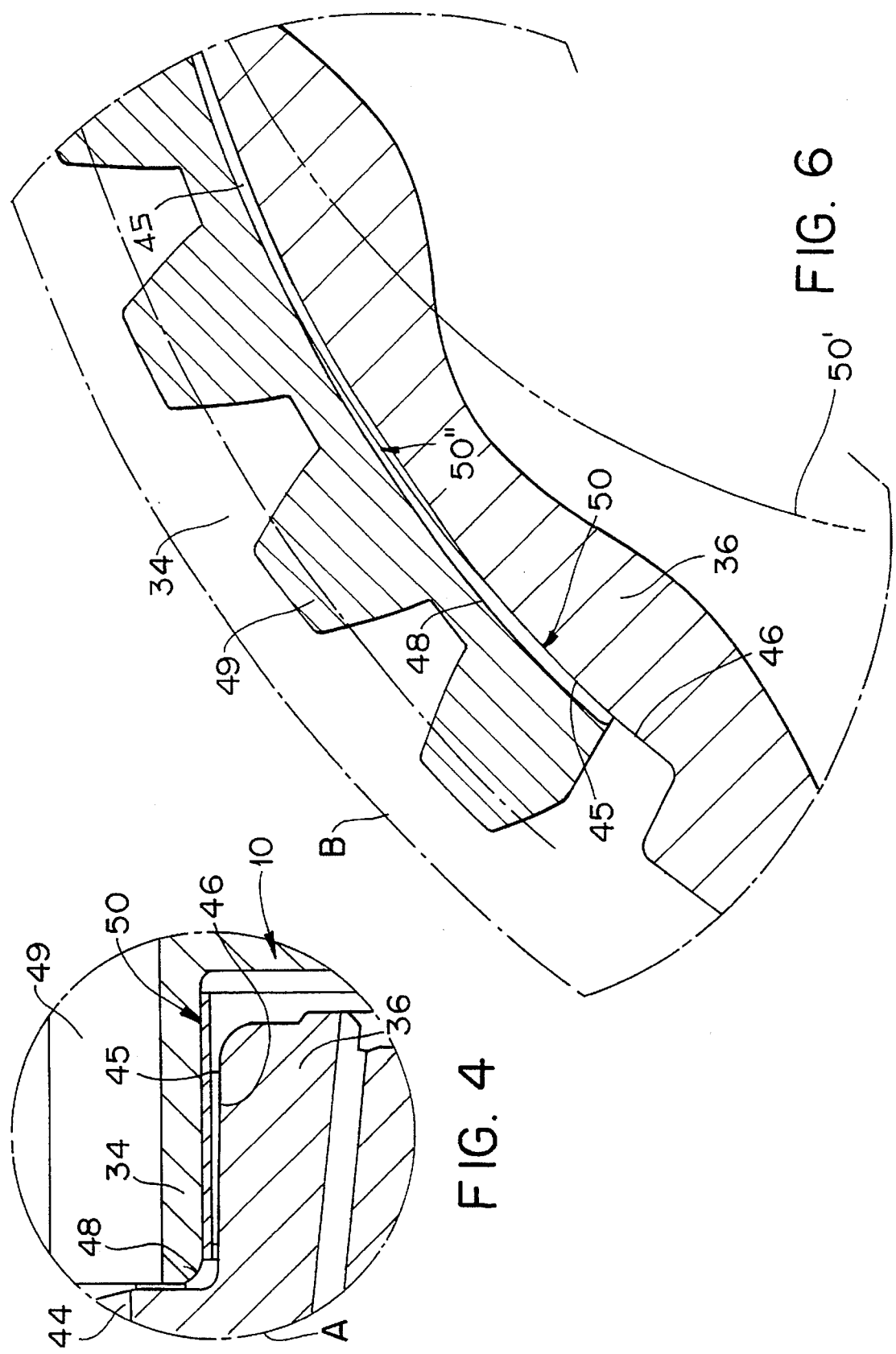

ARRANGEMENT FOR PREVENTING RATTLING IN A SYNCHRONIZED GEARBOX

BACKGROUND OF THE INVENTION

The present invention refers to an arrangement for preventing rattling caused by the synchronizing ring of an unengaged gear in a synchronized gear box and particularly to means preventing that ring from rotating back and forth freely on the shaft.

The object of such an arrangement is to prevent rattling noise being generated by a synchronizing ring for an unengaged gear in a synchronized gearbox. When the gear is not engaged, the synchronizing ring is designed to be capable, within a certain rotation angle range, of rotating relative to the synchronizing sleeve with which the synchronizing ring cooperates. The synchronizing ring is thus arranged loosely between a synchronizing hub arranged non-rotatably on a shaft incorporated in the gearbox on one axial side of the ring and a synchronizing cone (clutch ring) located on the other side of the ring and which is supported for rotation on the shaft and is intended to be connectable through the axially movable synchronizing sleeve to the synchronizing hub for the purpose of torque transmission. The synchronizing sleeve is supported in a conventional manner so as to be movable axially on the synchronizing hub. A conventional gearbox in which the invention is disposed may have a respective gear and a respective synchronizing ring on one axial side of or on both axial sides of the hub.

State of the Art

Modern synchronized gearboxes are provided with some kind of locking mechanism to prevent any possibility of the axially movable synchronizing sleeve of the synchronizing arrangement being brought into engagement with clutch teeth on the synchronizing cone of the relevant gearwheel before perfect synchronization is achieved between the relevant shaft and the gearwheel that has to be coupled to the shaft. These clutch teeth may either be arranged as a rim of teeth on a separate synchronizing cone which is fastened to the gearwheel or may be situated on a synchronizing cone which is integrated with the gearwheel. Axially outside this toothed rim, the gearwheel has an external, conical, tapering friction surface intended for synchronizing frictional cooperation with a corresponding internal, conical surface of the adjacent synchronizing ring.

When the conical inside surface of the synchronizing ring which has this internal configuration and is normally fitted loosely between the synchronizing cone and the synchronizing sleeve comes into frictional contact with the conical friction surface of the synchronizing cone, the synchronizing ring is rotated to a locking position (also an end position) in which locking teeth or claws on the synchronizing ring prevent axial movement of the synchronizing sleeve towards the toothed rim of the synchronizing cone so long as there is a difference in speed between the shaft bearing the synchronizing sleeve and the relevant gearwheel. When the speeds (rotation speeds) of these two parts have become fully equalized, i.e. when the synchronization is completed, the synchronizing ring is rotated back somewhat so that the axially extending internal ridges or teeth/cogs of the axially movable synchronizing sleeve can slide past the locking teeth of the synchronizing ring and continue until they engage the teeth in the torque-transmitting toothed rim of the synchronizing cone or, where applicable, of the gearwheel, thereby achieving the intended mutual connection of the shaft and the gearwheel.

However, a problem with this known design is that when the shaft is not engaged, the synchronizing ring generates rattling noise due to being fitted loosely between the synchronizing cone on the gearwheel and the synchronizing sleeve. This loose state, via the shaft and other connecting parts, subjects the synchronizing ring to torsional oscillations originating from the engine as a result of the ignition pulses in the cylinders. This rattling noise occurs when the synchronizing ring rotates to and fro between its end positions. The problem of course only occurs when the shaft is not engaged, since when the shaft is engaged, the synchronizing ring is in fact clamped firmly by the synchronizing sleeve. the problem is most obvious at low engine speeds. At higher engine speeds and higher vehicle speeds this rattling noise is in practice swamped by other more powerful sounds.

A prior design for dealing with this problem is known from U.S. Pat. No. 3,228,499 where the synchronizing ring is kept centered and fixed in position relative to the synchronizing sleeve by means of axially acting spring devices arranged between the synchronizing ring and the adjacent gearwheel. However, that design requires the synchronizing arrangement to be provided with special spring devices which, at one end, are fastened in axial bottom holes in the gearwheel close to the hub portion of that wheel and, at the opposite end, are accommodated in axial plugs on the outside of the synchronizing ring. Both the gearwheel and the synchronizing ring therefore have to be designed in this special manner and the spring devices also require a considerable space between the gearwheel and the synchronizing ring. Without being considerably redesigned, conventional synchronized gearboxes can therefore not be provided with this known type of spring devices to stabilize the synchronizing ring.

SUMMARY OF THE INVENTION

Object of the Invention

The object of the invention is therefore to provide an arrangement of very simple design and mode of operation for preventing rattling arising from a synchronizing ring for an unengaged gear in a synchronized gearbox. Further, the synchronizing ring should be held by means of radially directed forces applied by spring devices which can be fitted into the relevant area of the gearbox without requiring even the slightest extra space beyond that which is for other reasons still available in a synchronized gearbox of the relevant type. There also should be no need for any change of design of other parts or components incorporated in the gearbox, nor must the spring devices adopted lead to any negative effects on such other parts and components.

Description of the Invention

The aforesaid object is achieved according to the invention by disposing prestressed, radially acting spring clamping elements in an arcuate space between an outer surface of the synchronizing ring and an inside surface of a rim, particularly a rim that is externally ridged, for holding each synchronizing ring in a center prestressed position relative to that rim.

An arrangement according to the invention involves a suitable number of radially acting prestressed spring clamping elements inserted in the annular space between an outer surface on the synchronizing ring and an inside surface of the ridged rim of the synchronizing hub. In practice, it would probably be advantageous to use at least three spring clamping elements distributed evenly in the circumferential direction. The spring clamping elements thus serve to hold the synchronizing ring in a centered prestressed position relative to the ridged rim of the synchronizing hub when the gear is not yet engaged, since the synchronizing ring would otherwise (i.e., in the absence of such spring clamping elements) be arranged "loosely" between the synchronizing hub and adjacent gearwheel.

In the case of synchronized gearboxes of the kind relevant here, the ridged rim of the synchronizing hub normally comprises at least three flange-like ridged rim portions which are evenly distributed in the circumferential direction, are mutually separate and are provided externally with ridges that are like teeth. Each ridged rim portion is then connected with and is supported by the center part of the synchronizing hub via a disc-shaped web portion. It is in this case advantageous that the number of spring clamping elements should correspond directly to the number of ridged rim portions, resulting in a spring clamping element being incorporated at each ridged rim portion. The simplest and in this context most practical type of spring clamping elements would perhaps be arcuate plate spring elements. These plate spring elements are designed so that both in their unprestressed state (i.e. before being fitted) and when incorporated in their prestressed position (i.e. in their fitted state), they exhibit smaller bending radii than the ridged rim portions. Each plate spring element would thus be clamped between the outer surface of the synchronizing ring and the inside surface of its associated ridged rim portion.

The arcuate plate spring elements or, quite generally, the spring clamping elements fasten the synchronizing ring to the synchronizing hub so that the torsional oscillation movements originating from the ignition pulses of the engine are effectively damped and prevent the synchronizing ring from striking its end positions on the synchronizing hub. The spring elements thus act with radial forces, which admittedly means that during gear engagement the speeding up of the synchronizing ring will be slightly more sluggish. But, this increased sluggishness caused by the spring clamping elements is in practice so insignificant as to be virtually imperceptible.

The spring clamping elements thus advantageously designed as plate spring elements will therefore be situated in the space which is already available, so no modifications at all are required to other parts of the gearbox or to its synchronizing arrangement, at least not while the dimensions of the plate spring elements are kept within reasonable limits. The fact that the space already available in the gearbox and the synchronizing arrangement is sufficient and can be used for the design solution according to the invention also means that the design solution can be applied directly as a servicing solution for existing gearboxes which generate rattling noise which is considered excessive and therefore has to be prevented as far as possible by suitable modification of the gearbox.

The basic idea of the invention may therefore be summarized as follows. The spring clamping elements, which may, for example, be plate spring elements, are fitted in the annular "clearance space" between the synchronizing ring and the ridged rim of the synchronizing hub. The radial forces of the prestressed spring clamping elements keep the synchronizing ring suspended centrally with respect to the surrounding ridged rim of the synchronizing hub, whereby rotational movements of the synchronizing ring are prevented or at least damped by the frictional moment which the spring clamping elements exert on the external surface of the synchronizing ring as a result of the deformation (i.e. the bending radius increase) imparted to the clamping elements when they are fitted in the space between the synchronizing ring and the ridged rim of the synchronizing hub. The torsional oscillations which reach the synchronizing ring as the result of ignition pulses of the engine cannot overcome this frictional moment, so the synchronizing ring is prevented from generating such rattling noise as would have occurred were the synchronizing ring arranged "loosely". The frictional moment does admittedly create a certain resistance to rotation of the synchronizing ring (away from its locked position) which has to be overcome before the synchronizing sleeve can be moved to cause engagement of the ridged rim with the rim of clutch teeth on the adjacent gearwheel/synchronizing cone, which engagement means that the gear is engaged. However, this resistance caused by the frictional moment of the spring clamping elements to rotation of the synchronizing ring is so small as in practice to be hardly perceptible to drivers during manual engagement of the gear concerned, i.e. during the speeding up of the synchronizing ring from its locked position.

A rattling noise prevention arrangement according to the invention can be used with advantage in a manual synchronized five-speed gearbox for passenger cars. In such a gearbox, the synchronizing cone or the gearwheel has on its side facing the respective synchronizing ring an annular rim of clutch teeth, while the axially movable synchronizing sleeve has internal ridges which engage between the external ridges of the synchronizing hub and which during axial movement of the sleeve past the synchronizing ring which is then rotated away from its locked position can be brought toward gear engagement corresponding to driving engagement with the clutch teeth of the synchronizing cone of the gearwheel.

Other features and advantages of the present invention will become apparent from the following description of the invention which refers to the accompanying drawings.

BRIEF DESCRIPTION OF THE DRAWINGS

The invention will now be described and clarified further below with reference to the attached drawings which show a shiftable part of a manual synchronized gearbox taken as incorporating one or more arrangements according to the invention.

FIG. 4 shows an enlargement of the portion of FIG. 3 within the circle A;

FIG. 6 shows an enlargement of the arcuate area B in FIG. 5 depicting part of the ridged rim and the adjacent synchronizing ring.

DESCRIPTION OF A PREFERRED EMBODIMENT

Figure 1:
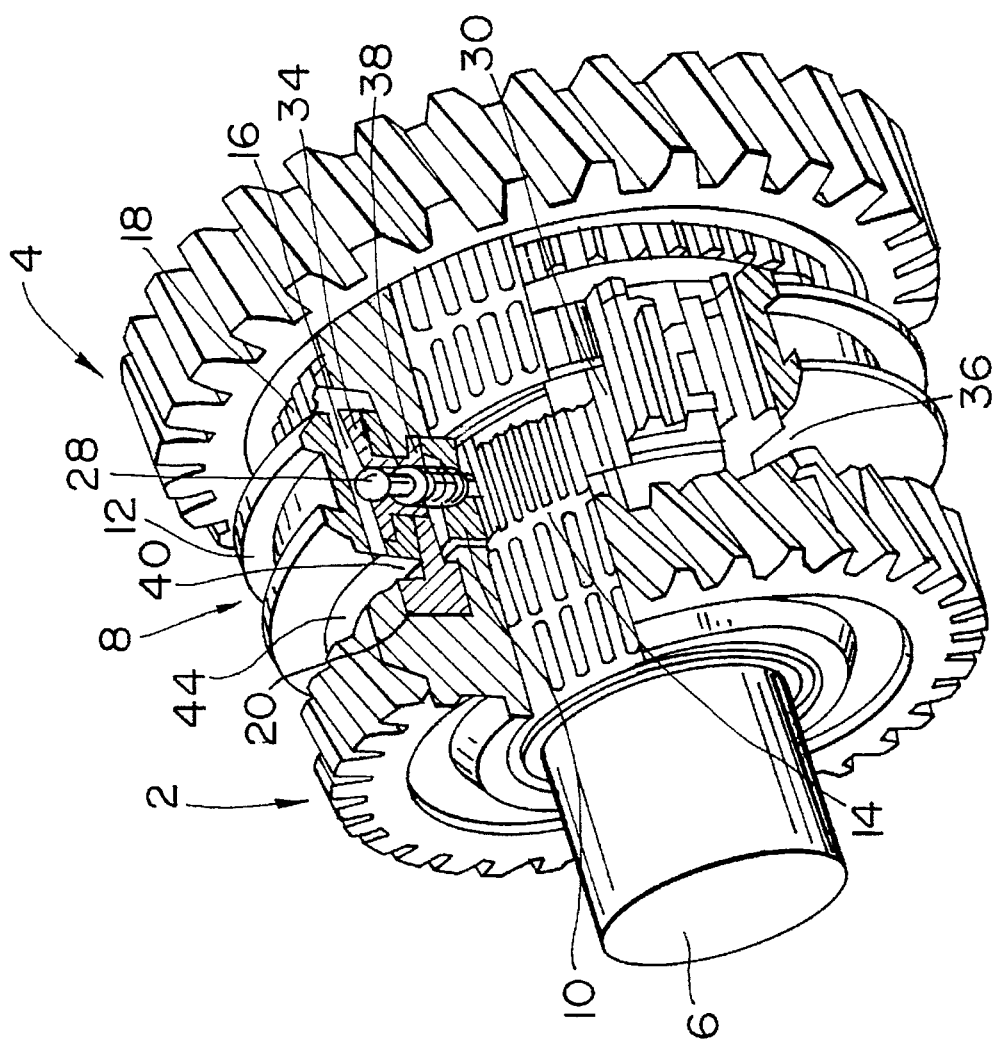
FIG. 1 shows in perspective and partly in section a shaft which forms part of a gearbox and has gearwheels for two different gears with a synchronizing arrangement placed between them.
Figure 2:
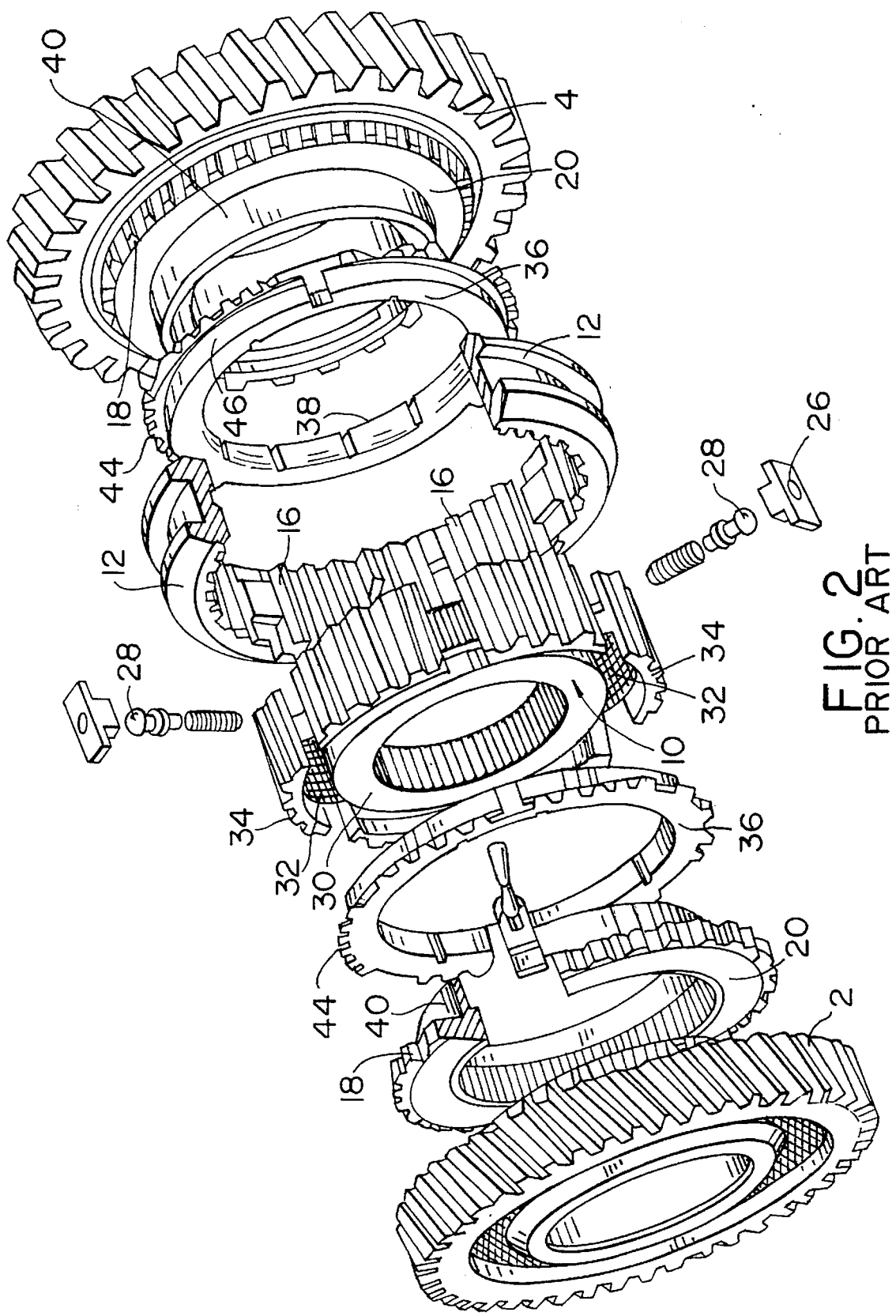
FIG. 2 shows the axially parted or exploded apart gearbox parts arranged about the shaft in FIG. 1.
Figure 5:
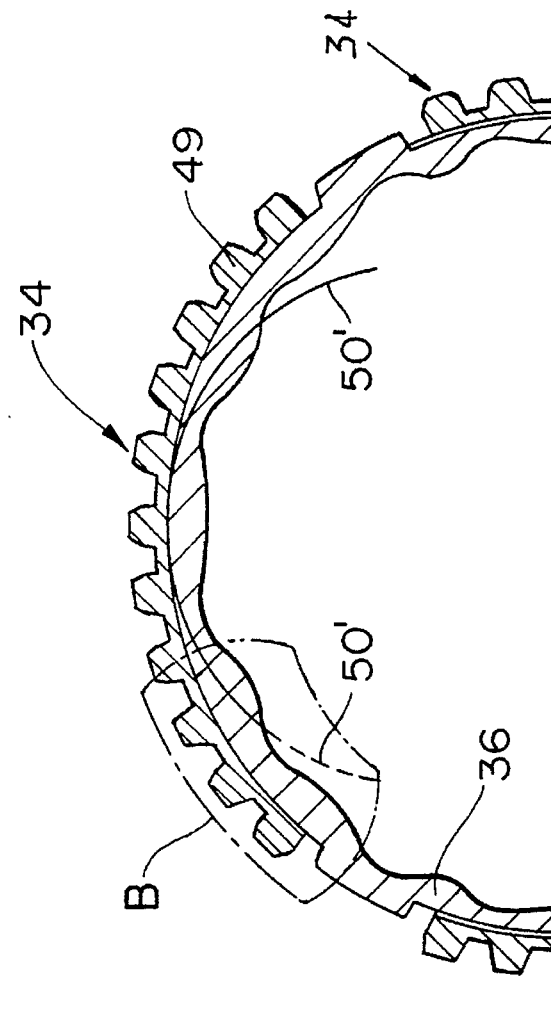
FIG. 5 shows a partial section along the line V—V in FIG. 3.
Figure 3:
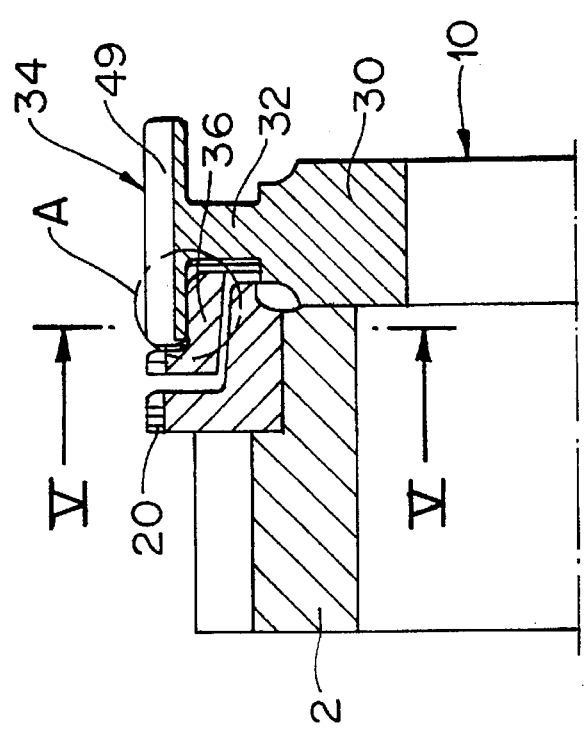
FIG. 3 shows a partial axial section through a gearwheel with an associated synchronizing hub and a respective synchronizing ring corresponding to the left hand part of FIG. 1.

FIG. 1 and FIG. 2 in general show a synchronizing arrangement of a known kind for a synchronized gearbox including two gears. These two drawings thus do not illustrate the invention but only its surroundings and the type of synchronizing gearbox for which the invention is intended. For this reason there may be some discrepancies as regards insignificant details as compared with other drawings and the description.

FIGS. 1 and 2 thus show a synchronization arrangement for a pair of gearwheels 2 and 4 mounted on a shaft 6 which forms part of an otherwise undepicted synchronized gearbox intended, for example for use in a vehicle. Although two gearwheels are shown on shaft 6, the invention is adapted for one gearwheel on the shaft, as well. The synchronizing arrangement 8 placed between 11 the gearwheels 2 and 4 comprises a synchronizing hub 10 and a synchronizing sleeve 12 that surrounds the hub. The gearwheels 2 and 4 are mounted for rotation on and with respect to the shaft 6, while the synchronizing hub 10 is mounted non-rotatably on a portion 14 of the shaft 6, which portion 14 is grooved or provided with splines (alternating ridges and grooves running axially). Shifting between two different gears (gear ratio change) in the case illustrated is done by the synchronizing hub 10, which is thus arranged to not rotate with respect to the shaft 6, and is brought into torque-transmitting driving connection with either the gearwheel 2 or the gearwheel 4. This alternative arrangement of either of the gearwheels 2 and 4 is performed in a conventional manner by moving the synchronizing sleeve 12 axially (by means of an undepicted shift fork) with respect to the synchronizing hub 10 so that internal axial ridges 16 on the inside of the synchronizing sleeve 12 are brought into driving engagement with an annular rim of clutch teeth 18 on a respective synchronizing cone 20 which is in its turn firmly connected to (or integrated with) the relevant gearwheel 2, 4. In this example, the synchronizing cone 20 is firmly welded to the gearwheel.

A suitable number of radially spring-loaded locking balls 28 (e.g. three) serve in a conventional manner not only to center the synchronizing sleeve 12 axially while the gear is still unengaged but also, via the adaptor 26, to urge the respective synchronizing ring 36 toward which the sleeve 12 is being moved, to abut against the relevant synchronizing cone 20 during gear engagement.

The synchronizing hub 10 comprises an annular center part 30 which is mounted non-rotatably on the shaft 6 via the ridged connection 14 and which has three disc-shaped webs 32 evenly distributed in the circumferential direction, and each web bears an arcuate ridged portion 34 at its outer edge. These ridged rim portions are substantially wider than the webs 32 are thick and hence protrude laterally as flange portions on both axial sides of the webs 32.

A pair of synchronizing rings 36 on opposite axial sides of the hub 10 are in a conventional manner fitted "loosely" immediately adjacent to the ridged rim portions 34 of the hub. The synchronizing rings 36 have conical inside surfaces 38 that are disposed adjacent to and may be moved into frictional contact with the conical external surface areas 40 having a corresponding configuration and located on the outside surfaces of the synchronizing cones 20 on the gearwheel.

Synchronization of the speed of the shaft 6 and the relevant gearwheel 2, 4 is effected by the synchronizing sleeve 12 being moved axially towards the relevant gearwheel so that the conical inside surface 38 of the synchronizing ring 36 cooperating with the relevant synchronizing cone 20 is brought into frictional contact with the conical surface area 40 of the synchronizing cone. This frictional contact rotates the synchronizing ring to its locking position at which the locking teeth 44 of the ring prevent further axial movement of the synchronizing sleeve 12 to engage the rim of clutch teeth 18, while the friction between the conical surfaces 38 and 40 brings the gearwheel 2, 4 quickly to a speed synchronized with the speed of the shaft, usually the same speed as the shaft 6 either by speeding up or slowing down the speed of the gearwheel. When this is accomplished, i.e., when synchronization is complete, a continuing axial movement of the synchronizing sleeve 12 towards the gearwheel 2, 4 causes the synchronizing ring 36 to turn back to its non-locking rotational position in which the internal ridges of the synchronizing sleeve 12 are free to move axially past the synchronizing ring 36 (via the openings between the teeth 44 of the synchronizing ring) and continue until there is driving engagement between the rim of teeth 18 of the synchronizing cone 20 concerned.

This special description so far applies to a known type of synchronizing arrangement. FIGS. 3–6 show the novel design elements which according to the present invention are incorporated in the synchronizing arrangement and serve to prevent rattling arising from a synchronizing ring for an unengaged gear in a synchronized gearbox, of the general type partially depicted in FIG. 1 and FIG. 2.

As previously mentioned, when the gear, i.e. the gearwheel 2 or 4, is not engaged, each of the two synchronizing rings 36 shown in FIGS. 1 and 2 is arranged for rotation with respect to the shaft 6 and is disposed between, on one side, the synchronizing sleeve 12 mounted non-rotatably on the shaft 6 and, on the other side, the gearwheel 2, 4 or the synchronizing cone 20 of the gearwheel mounted rotatably on the shaft, which gearwheel or synchronizing cone is intended to be put into torque-transmitting connection with the synchronizing sleeve 12 when the gear concerned becomes engaged. The synchronizing sleeve is non-rotatable relative to the shaft 6 via the hub 10.

As may particularly be seen in FIGS. 3–6, the primary distinguishing feature of the invention is the radially acting spring clamping elements, which advantageously take the form of arcuate plate spring elements 50 and which are inserted with prestress in the arcuate space 45 (see particularly FIGS. 4 and 6) between the outer, external surface 46 of the synchronizing ring 36 and the inside surface 48 of the ridged rim 34 of the synchronizing hub 10. Such a plate spring element is shown in cross-section in FIG. 4 and side view in FIG. 6.

In the embodiment illustrated, the ridged rim of the synchronizing hub 10 comprises a plurality, here three, ridged rim portions 34 which are evenly distributed in the circumferential direction, are mutually separate and are provided with external axially directed ridges 49. Each synchronizing ring 36 is thus clamped firmly by three plate spring elements 50 which serve to hold it in a prestressed position with respect to the three ridged rim portions 34 of the synchronizing hub 10.

The arcuately bent plate spring elements 50 are plate springs of even width made of spring steel. As may be seen in FIG. 5 and FIG. 6, the plate spring elements 50 are so designed as to exhibit smaller bending radii than the ridged rim portions 34, not only in the unprestressed state (see 50' in FIGS. 5 and 6) but also when they are fitted in their prestressed position (see 50" in FIG. 6). The plate spring elements 50 are dimensioned and adapted so as to provide sufficient force to keep the synchronizing ring 36 in position without rotating relative to the hub 10 but no more force than is required to avoid making the speeding up of the synchronizing ring 36 during normal gearshifts unnecessarily more difficult.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An arrangement for preventing the rattling of a synchronizing ring for an unengaged gearwheel in a synchronized gearbox, comprising:

the synchronized gearbox including a rotatable shaft, a hub fixed for rotation with the shaft, a gearwheel located at one axial side of the hub and mounted for rotation around and with respect to the shaft;

a synchronizing sleeve around the hub to rotate with the hub and also being axially movable with respect to the hub and along the shaft toward the gearwheel, the synchronizing sleeve is for transmitting torque from the shaft to the gearwheel toward which the sleeve is moved;

a synchronizing ring around the shaft and between the hub and the gearwheel, the synchronizing sleeve being movable into engagement with the synchronizing ring for pushing the synchronizing ring in the direction toward the gearwheel toward which the sleeve is moved;

a selectively engageable friction connection between the gearwheel and the synchronizing ring such that the synchronizing sleeve pressing on the synchronizing ring makes the frictional connection between the synchronizing ring and the gearwheel for causing rotation of the gearwheel;

the synchronizing ring including blocking means for blocking the movement of the synchronizing sleeve into engagement with the gearwheel toward which the synchronizing sleeve is being moved until the rotation speeds of the synchronizing ring and the gearwheel have been synchronized with the rotation speed of the synchronizing sleeve and the hub, and the blocking means then permitting the synchronizing sleeve to be moved into driving engagement with the gearwheel toward which the sleeve is being moved for driving the gearwheel at the rotation speed of the synchronizing sleeve;

the synchronizing hub including a rim with a first peripheral exterior engaged by the synchronizing sleeve, the hub including a peripheral interior surface which defines a space;

the synchronizing ring including a portion which extends into the space defined inside the interior surface of the rim of the synchronizing hub, and the portion has a second exterior surface, the second exterior surface and the interior surface of the hub being respectively of such diameters to define an arcuate space between the second exterior surface and the interior surface of the rim of the synchronizing hub;

radially acting spring clamping elements inserted with prestress in the respective arcuate space between the second exterior surface of the synchronizing ring and the interior surface of the rim of the hub, the clamping elements being shaped, sized and prestressed for holding the synchronizing ring in a rotational generally centered prestressed position relative to the rim portion of the synchronizing hub.

2. The arrangement of claim 1, wherein the rim of the synchronizing hub comprises a plurality of flange like rim portions distributed circumferentially around the synchronizing hub and separated from one another;

the clamping elements comprise a plurality of arcuate plate shaped spring elements corresponding in number to the rim portions, the clamping elements being such that both in their unprestressed state and when prestressed in a position between the rim portions and the synchronizing ring, the spring elements have respective smaller bending radii than the rim portions of the hub.

3. The arrangement of claim 2, wherein the rim of the hub comprises three rim portions and there are three of the clamping elements.

4. The arrangement of claim 2, wherein the rim portions are evenly distributed circumferentially.

5. The arrangement of claim 2, further comprising means for clamping the plate shaped spring elements between the second exterior surface of the synchronizing ring and the interior surface of the respective rim portion at the spring element.

6. The arrangement of claim 2, wherein the flange like rim portions have external ridges defined on their respective exteriors and the synchronizing sleeve has cooperating ridges on the interior thereof for cooperating with the external ridges to transmit torque between the sleeve and the hub while permitting the sleeve to shift axially along the hub.

7. The arrangement of claim 2, wherein each arcuate plate spring element comprises an arcuately bent plate spring.

8. The arrangement of claim 7, wherein the plate spring is of even width.

9. The arrangement of claim 7, wherein each plate spring is of spring steel.

10. The arrangement of claim 1, wherein the friction connection comprises a first friction applying surface on the gearwheel shaped and placed for engaging and cooperating with a second friction applying surface in the interior of the synchronizing ring.

11. The arrangement of claim 10, wherein the friction connection comprise a synchronizing cone shaped element connected with the gear wheel, a complementary cone shaped opening in the respective synchronizing ring engageable with the respective cone shaped element.

12. The arrangement of claim 1, further comprising an annular rim of teeth on the gearwheel;

the synchronizing sleeve being axially movable past the synchronizing ring and into engagement with the annular rim of teeth on the gearwheel for driving the gearwheel to rotate with the synchronizing sleeve.

13. The arrangement of claim 12, wherein the synchronizing ring has a first rotative position around the shaft, wherein teeth thereon are positioned to block movement of the synchronizing sleeve into engagement with the rim of teeth in the respective gearwheel and a second rotative position wherein the teeth thereon are positioned to permit such movement of the synchronizing sleeve into engagement with the rim of teeth on the respective gearwheel.

14. The arrangement of claim 12, wherein the friction connection comprises a respective first and second synchronizing cone shaped element connected with each of first and second gears, and the cone element having the respective annular rim of teeth defined thereon.

15. The arrangement of claim 1, wherein the rotation speeds of the synchronizing ring and the gear wheel are synchronized by selectively increasing or decreasing the speed of the gear wheel until it is synchronized with the speed of synchronizing sleeve.

16. An arrangement for preventing the rattling of a synchronizing ring for an unengaged gearwheel in a synchronized gearbox, comprising:

the synchronized gearbox including a rotatable shaft, a hub fixed for rotation with the shaft, first and second gearwheels respectively located at opposite axial sides of the hub and mounted for rotation around and with respect to the shaft;

a synchronizing sleeve around the hub to rotate with the hub and also being axially movable with respect to the hub and along the shaft toward a selected one of the first and second gearwheels, the synchronizing sleeve is for transmitting torque from the shaft to the selected one of the gearwheels toward which the sleeve is moved;

a first synchronizing ring around the shaft and between the hub and the first gearwheel, a second synchronizing ring around the shaft and between the hub and the second gearwheel, the synchronizing sleeve being movable into engagement with one of the synchronizing rings for pushing that synchronizing ring in the direction toward the respective gearwheel toward which the sleeve is moved;

a selectively engageable friction connection between each of the first and second gearwheels and the respective first and second synchronizing rings such that the synchronizing sleeve pressing on one of the synchronizing rings makes the frictional connection between that synchronizing ring and the respective gearwheel for causing rotation of that gearwheel;

each synchronizing ring including blocking means for blocking the movement of the synchronizing sleeve into engagement with the one of the first and second gearwheels toward which the synchronizing sleeve is being moved until the rotation speeds of the respective synchronizing ring and the one gearwheel have been synchronized with the rotation speed of the synchronizing sleeve and the hub, and the blocking means then permitting the synchronizing sleeve to be moved into driving engagement with the one gearwheel toward which the sleeve is being moved for driving the one gearwheel at the rotation speed of the synchronizing sleeve;

the synchronizing hub including a rim with a first peripheral exterior engaged by the synchronizing sleeve, the hub including a peripheral interior surface which defines a space;

each synchronizing ring including a portion which extends into the space defined inside the interior surface of the rim of the synchronizing hub, and the portion has a second exterior surface, the second exterior surface and the interior surface of the hub being respectively of such diameters to define an arcuate space between the second exterior surface and the interior surface of the rim of the synchronizing hub;

radially acting spring clamping elements inserted with prestress in the respective arcuate space between the second exterior surface of each synchronizing ring and the interior surface of the rim of the hub, the clamping elements being shaped, sized and prestressed for holding the respective synchronizing ring in a rotational generally centered prestressed position relative to the rim portion of the synchronizing hub.

17. The arrangement of claim 16, wherein the rim of the synchronizing hub comprises a plurality of flange like rim portions distributed circumferentially around the synchronizing hub and separated from one another;

the clamping elements comprise a plurality of arcuate plate shaped spring elements corresponding in number to the rim portions, the clamping elements being such that both in their unprestressed state and when prestressed in a position between the rim portions and the synchronizing ring, the spring elements have respective smaller bending radii than the rim portions of the hub.

18. The arrangement of claim 17, further comprising means for clamping the plate shaped spring elements between the second exterior surface of the synchronizing ring and the interior surface of the respective rim portion at the spring element.

19. The arrangement of claim 16, wherein the friction connections comprise a respective first friction applying surface on each gearwheel shaped and placed for engaging and cooperating with a second friction applying surface in the interior of the respective synchronizing ring.

20. The arrangement of claim 19, wherein the friction connections comprise a respective first and second synchronizing cone shaped element connected with each of the first and second gears, a respective complementary cone shaped opening in the respective synchronizing ring engageable with the respective cone shaped element.

21. The arrangement of claim 16, further comprising an annular rim of teeth on each of the first and second gearwheels;

the synchronizing sleeve being axially movable past the selected one of the synchronizing rings and into engagement with the annular rim of teeth on the selected gearwheel for driving the respective gearwheel to rotate with the synchronizing sleeve.

22. An arrangement for preventing the rattling of a synchronizing ring for an unengaged gearwheel in a synchronized gearbox, comprising:

the synchronized gearbox including a rotatable shaft, a hub fixed for rotation with the shaft, a gearwheel located at one axial side of the hub and mounted for rotation around and with respect to the shaft;

a synchronizing sleeve around the hub to rotate with the hub and also being axially movable with respect to the hub and along the shaft toward the gearwheel, the synchronizing sleeve is for transmitting torque from the shaft to the gearwheel toward which the sleeve is moved;

a synchronizing ring around the shaft and between the hub and the gearwheel, the synchronizing sleeve being movable into engagement with the synchronizing ring for pushing the synchronizing ring in the direction toward the gearwheel toward which the sleeve is moved;

a selectively engageable friction connection between the gearwheel and the synchronizing ring such that the synchronizing sleeve pressing on the synchronizing ring makes the frictional connection between the synchronizing ring and the gearwheel for causing rotation of the gearwheel;

the synchronizing ring including blocking device to block the movement of the synchronizing sleeve into engagement with the gearwheel toward which the synchronizing sleeve is being moved until the rotation speeds of the synchronizing ring and the gearwheel have been synchronized with the rotation speed of the synchronizing sleeve and the hub, and the blocking device then permitting the synchronizing sleeve to be moved into driving engagement with the gearwheel toward which the sleeve is being moved for driving the gearwheel at the rotation speed of the synchronizing sleeve;

the synchronizing hub including a rim with a first peripheral exterior engaged by the synchronizing sleeve, the hub including a peripheral interior surface which defines a space;

the synchronizing ring including a portion which extends into the space defined inside the interior surface of the rim of the synchronizing hub, and the portion has a second exterior surface, the second exterior surface and the interior surface of the hub being respectively of such diameters to define an arcuate space between the second exterior surface and the interior surface of the rim of the synchronizing hub;

radially acting spring clamping elements inserted with prestress in the respective arcuate space between the second exterior surface of the synchronizing ring and the interior surface of the rim of the hub, the clamping elements being shaped, sized and prestressed for holding the synchronizing ring in a rotational generally centered prestressed position relative to the rim portion of the synchronizing hub.

23. An arrangement for preventing the rattling of a synchronizing ring for an unengaged gearwheel in a synchronized gearbox, comprising:

the synchronized gearbox including a rotatable shaft, a hub fixed for rotation with the shaft, first and second gearwheels respectively located at opposite axial sides of the hub and mounted for rotation around and with respect to the shaft;

a synchronizing sleeve around the hub to rotate with the hub and also being axially movable with respect to the hub and along the shaft toward a selected one of the first and second gearwheels, the synchronizing sleeve is for transmitting torque from the shaft to the selected one of the gearwheels toward which the sleeve is moved;

a first synchronizing ring around the shaft and between the hub and the first gearwheel, a second synchronizing ring around the shaft and between the hub and the second gearwheel, the synchronizing sleeve being movable into engagement with one of the synchronizing rings for pushing that synchronizing ring in the direction toward the respective gearwheel toward which the sleeve is moved;

a selectively engageable friction connection between each of the first and second gearwheels and the respective first and second synchronizing rings such that the synchronizing sleeve pressing on one of the synchronizing rings makes the frictional connection between that synchronizing ring and the respective gearwheel for causing rotation of that gearwheel;

each synchronizing ring including blocking device to block the movement of the synchronizing sleeve into engagement with the one of the first and second gearwheels toward which the synchronizing sleeve is being moved until the rotation speeds of the respective synchronizing ring and the one gearwheel have been synchronized with the rotation speed of the synchronizing sleeve and the hub, and the blocking device then permitting the synchronizing sleeve to be moved into driving engagement with the one gearwheel toward which the sleeve is being moved for driving the one gearwheel at the rotation speed of the synchronizing sleeve;

the synchronizing hub including a rim with a first peripheral exterior engaged by the synchronizing sleeve, the hub including a peripheral interior surface which defines a space;

each synchronizing ring including a portion which extends into the space defined inside the interior surface of the rim of the synchronizing hub, and the portion has a second exterior surface, the second exterior surface and the interior surface of the hub being respectively of such diameters to define an arcuate space between the second exterior surface and the interior surface of the rim of the synchronizing hub;

radially acting spring clamping elements inserted with prestress in the respective arcuate space between the second exterior surface of each synchronizing ring and the interior surface of the rim of the hub, the clamping elements being shaped, sized and prestressed for holding the respective synchronizing ring in a rotational generally centered prestressed position relative to the rim portion of the synchronizing hub.

* * * * *